(12) United States Patent
Lambert

(10) Patent No.: US 9,294,287 B2
(45) Date of Patent: Mar. 22, 2016

(54) INTERROGATING AN AUTHENTICATION DEVICE

(75) Inventor: Robert John Lambert, Cambridge (CA)

(73) Assignee: Certicom Corp., Mississauga, ON (CA)

( * ) Notice: Subject to any disclaimer, the term of this patent is extended or adjusted under 35 U.S.C. 154(b) by 1019 days.

(21) Appl. No.: 13/428,605

(22) Filed: Mar. 23, 2012

(65) Prior Publication Data

US 2012/0242459 A1    Sep. 27, 2012

Related U.S. Application Data

(60) Provisional application No. 61/467,504, filed on Mar. 25, 2011.

(30) Foreign Application Priority Data

Jul. 15, 2011    (WO) ................ PCT/CA2011/050438

(51) Int. Cl.
*G08B 21/00*    (2006.01)
*H04L 9/32*    (2006.01)
*H04W 12/06*    (2009.01)

(52) U.S. Cl.
CPC ............ *H04L 9/3271* (2013.01); *H04W 12/06* (2013.01)

(58) Field of Classification Search
CPC ............................ H04L 9/3271; H04W 12/06
See application file for complete search history.

(56) References Cited

U.S. PATENT DOCUMENTS

| | | | |
|---|---|---|---|
| 5,661,806 A | 8/1997 | Nevoux et al. | |
| 5,666,415 A | 9/1997 | Kaufman | |
| 6,070,246 A | 5/2000 | Beser | |
| 6,189,146 B1 | 2/2001 | Misra | |
| 6,377,691 B1 | 4/2002 | Swift et al. | |
| 6,430,302 B2 | 8/2002 | Rhoads | |
| 7,194,765 B2 | 3/2007 | Blom | |

(Continued)

FOREIGN PATENT DOCUMENTS

| | | |
|---|---|---|
| CA | 2611818 | 12/2006 |
| CN | 101945104 | 1/2011 |

(Continued)

OTHER PUBLICATIONS

U.S. Appl. No. 13/462,975, filed May 3, 2012.

(Continued)

*Primary Examiner* — Mark Rushing
(74) *Attorney, Agent, or Firm* — Fish & Richardson P.C.

(57) ABSTRACT

Methods, systems, and computer programs for interrogating an authentication device are disclosed. For example, a mobile device can include an interrogator module that interrogates an authentication module in a mobile device accessory, for example, upon installation of the mobile device accessory. In some implementations, challenge-response pairs and a challenge-response distribution are stored in a memory of an interrogator module. The challenge-response distribution defines selection probabilities for the challenge values. In some instances, the interrogator module receives an authentication request from an authentication module, and in response to the authentication request, the interrogator module selects an initial challenge value according to the challenge-response distribution. The interrogator module sends the authentication module an interrogation message that includes the initial challenge value. The interrogator module can modify the challenge-response distribution, for example, based on suspicious behavior.

26 Claims, 5 Drawing Sheets

(56) References Cited

U.S. PATENT DOCUMENTS

| | | | |
|---|---|---|---|
| 7,554,288 | B2 | 6/2009 | Gangstoe et al. |
| 7,596,699 | B2 | 9/2009 | Kwok |
| 7,667,429 | B2 | 2/2010 | Little |
| 7,863,858 | B2 | 1/2011 | Gangstoe et al. |
| 8,278,870 | B2 | 10/2012 | Little |
| 8,296,565 | B2 | 10/2012 | Taylor |
| 8,402,267 | B1 | 3/2013 | Graham et al. |
| 2003/0055962 | A1 | 3/2003 | Freund et al. |
| 2003/0061519 | A1 | 3/2003 | Shibata et al. |
| 2003/0154355 | A1 | 8/2003 | Fernandez |
| 2003/0204734 | A1 | 10/2003 | Wheeler |
| 2003/0233546 | A1 | 12/2003 | Blom |
| 2004/0015692 | A1 | 1/2004 | Green et al. |
| 2004/0066278 | A1 | 4/2004 | Hughes et al. |
| 2005/0001589 | A1 | 1/2005 | Edington et al. |
| 2005/0010782 | A1 | 1/2005 | Ohkubo |
| 2005/0123135 | A1 | 6/2005 | Hunt et al. |
| 2005/0149726 | A1 | 7/2005 | Joshi |
| 2005/0188206 | A1 | 8/2005 | Kwok |
| 2006/0015725 | A1* | 1/2006 | Voice et al. ............ 713/168 |
| 2006/0117176 | A1 | 6/2006 | Sasaki et al. |
| 2006/0143700 | A1 | 6/2006 | Herrmann |
| 2006/0154631 | A1 | 7/2006 | Nakano |
| 2006/0173943 | A1 | 8/2006 | Luzzi et al. |
| 2006/0204004 | A1 | 9/2006 | Shankar et al. |
| 2006/0205388 | A1 | 9/2006 | Semple et al. |
| 2006/0212701 | A1 | 9/2006 | Warwick |
| 2006/0230436 | A1 | 10/2006 | Holtmanns et al. |
| 2007/0024235 | A1 | 2/2007 | Guthrie |
| 2007/0123304 | A1 | 5/2007 | Pattenden et al. |
| 2007/0123316 | A1* | 5/2007 | Little ............ 455/573 |
| 2007/0143864 | A1 | 6/2007 | Cabana et al. |
| 2007/0157023 | A1 | 7/2007 | Kotzin |
| 2007/0192877 | A1 | 8/2007 | Yoo |
| 2007/0260892 | A1 | 11/2007 | Paul et al. |
| 2007/0278992 | A1 | 12/2007 | Paul et al. |
| 2008/0024268 | A1 | 1/2008 | Wong et al. |
| 2008/0091957 | A1 | 4/2008 | Everett et al. |
| 2008/0123863 | A1 | 5/2008 | Bade et al. |
| 2008/0136607 | A1 | 6/2008 | Ratcliff et al. |
| 2008/0159534 | A1 | 7/2008 | Rager et al. |
| 2008/0179401 | A1 | 7/2008 | Hart et al. |
| 2008/0201395 | A1 | 8/2008 | Luzzi et al. |
| 2008/0252477 | A1 | 10/2008 | Howard |
| 2008/0276092 | A1 | 11/2008 | Eberhardt et al. |
| 2009/0055645 | A1 | 2/2009 | Park et al. |
| 2009/0091427 | A1* | 4/2009 | Shiotsu et al. ............ 340/10.1 |
| 2009/0096574 | A1 | 4/2009 | Oberle |
| 2009/0113534 | A1 | 4/2009 | Nanda et al. |
| 2009/0206937 | A1 | 8/2009 | Luzzi et al. |
| 2009/0240943 | A1 | 9/2009 | Brown et al. |
| 2009/0243539 | A1 | 10/2009 | Gangstoe et al. |
| 2009/0256717 | A1 | 10/2009 | Iwai |
| 2009/0265411 | A1 | 10/2009 | Maletsky |
| 2009/0292918 | A1 | 11/2009 | Mori |
| 2009/0295326 | A1 | 12/2009 | Daynes et al. |
| 2010/0005300 | A1 | 1/2010 | Klotsche |
| 2010/0011218 | A1 | 1/2010 | Shankar et al. |
| 2010/0024029 | A1 | 1/2010 | Sasaki et al. |
| 2010/0026236 | A1 | 2/2010 | Kamiyama et al. |
| 2010/0042824 | A1 | 2/2010 | Lee et al. |
| 2010/0056228 | A1 | 3/2010 | Brown et al. |
| 2010/0063932 | A1 | 3/2010 | Camenisch et al. |
| 2010/0148721 | A1 | 6/2010 | Little |
| 2010/0178961 | A1 | 7/2010 | Book et al. |
| 2010/0197367 | A1 | 8/2010 | Pattenden et al. |
| 2011/0078549 | A1 | 3/2011 | Thueringer et al. |
| 2011/0151834 | A1 | 6/2011 | Dabholkar |
| 2011/0194694 | A1 | 8/2011 | Struik |
| 2011/0200193 | A1* | 8/2011 | Blitz et al. ............ 380/277 |
| 2011/0246769 | A1 | 10/2011 | Wilson |
| 2011/0314288 | A1 | 12/2011 | Yogev et al. |
| 2012/0167169 | A1 | 6/2012 | Ge |
| 2012/0213361 | A1 | 8/2012 | Lim et al. |
| 2012/0223671 | A1 | 9/2012 | Seethaler et al. |
| 2012/0239555 | A1 | 9/2012 | Seethaler et al. |
| 2012/0242459 | A1 | 9/2012 | Lambert |
| 2012/0315959 | A1 | 12/2012 | Book et al. |
| 2013/0078912 | A1 | 3/2013 | San Vicente |
| 2013/0117488 | A1 | 5/2013 | Perry |
| 2013/0166909 | A1 | 6/2013 | Agrawal et al. |

FOREIGN PATENT DOCUMENTS

| | | |
|---|---|---|
| EP | 628935 | 12/1994 |
| EP | 1596529 | 11/2005 |
| EP | 1965539 A1 | 9/2008 |
| EP | 2159731 | 3/2010 |
| JP | 2008048166 | 2/2008 |
| JP | 2011135464 | 7/2011 |
| WO | 2007084601 | 7/2007 |
| WO | 2009/073969 | 6/2009 |
| WO | 2010/057312 | 5/2010 |

OTHER PUBLICATIONS

U.S. Appl. No. 13/690,996, filed Nov. 30, 2012.
U.S. Appl. No. 13/691,101, filed Nov. 30, 2012.
Extended European Search Report issued in European Application No. 11862495.6 on Sep. 1, 2014; 6 pages.
Extended European Search Report issued in European Application No. 11864911.0 on Sep. 22, 2014; 6 pages.
International Preliminary Report on Patentability issued in International Application No. PCT/CA2011/050278 on Nov. 21, 2013; 5 pages.
Office Action issued in U.S. Appl. No. 13/462,975 on Mar. 26, 2014; 17 pages.
Office Action issued in U.S. Appl. No. 13/462,975 on Sep. 8, 2014.
Office Action issued in U.S. Appl. No. 13/691,101 on Nov. 19, 2014.
International Preliminary Report on Patentability issued in International Application No. PCT/CA2011/050438 on Oct. 10, 2013; 6 pages.
Office Action issued in U.S. Appl. No. 13/691,101 on Jun. 13, 2014.
Battery Authentication and Security Schemes, Texas Instruments, Application Report SLUA346÷Jul. 2005, 7 pages.
Atmel, CryptoAuthentication, AT88SA100S, Battery Authentication Chip, Preliminary, Copyright 2009 Atmel Corp. 21 pages.
Darrel Hankerson, Alfred J. Menezes, Scott A. Vanstone, Guide to Elliptic Curve Cryptography, SpringerVerlag, 2004. 332 pages.
International Search Report and Written Opinion issued in International Application No. PCT/CA2011/050438 on Oct. 21, 2011; 9 pages.
International Search Report and Written Opinion issued in International Application No. PCT/CA2011/050278 on Dec. 21, 2011; 8 pages.
Alfred J. Menezes, Paul C. van Oorschot, et Scott A. Vanstone, Handbook of Applied Cryptography—Chapter 1, 49 pages, 1996.
Alfred J. Menezes, Paul C. van Oorschot, et Scott A. Vanstone, Handbook of Applied Cryptography—Chapter 6, 33 pages, 1996.
Alfred J. Menezes, Paul C. van Oorschot, et Scott A. Vanstone, Handbook of Applied Cryptography—Chapter 7, 61 pages, 1996.
Alfred J. Menezes, Paul C. van Oorschot, et Scott A. Vanstone, Handbook of Applied Cryptography—Chapter 8, 38 pages, 1996.
Alfred J. Menezes, Paul C. van Oorschot, et Scott A. Vanstone, Handbook of Applied Cryptography—Chapter 9, 64 pages, 1996.
Alfred J. Menezes, Paul C. van Oorschot, et Scott A. Vanstone, Handbook of Applied Cryptography—Chapter 10, 41 pages, 1996.
Alfred J. Menezes, Paul C. van Oorschot, et Scott A. Vanstone, Handbook of Applied Cryptography—Chapter 11, 65 pages, 1996.
Alfred J. Menezes, Paul C. van Oorschot, et Scott A. Vanstone, Handbook of Applied Cryptography—Chapter 12, 54 pages, 1996.
Alfred J. Menezes, Paul C. van Oorschot, et Scott A. Vanstone, Handbook of Applied Cryptography—Chapter 13, 49 pages, 1996.
Office Action issued in U.S. Appl. No. 13/690,996 on Jun. 23, 2014.
Atmel, Crypto-Authentication, High Level Security Models, Application Note, 8666A-SMIC-03/09, 11 pages, published in Mar. 2009 by Atmel Corporation.
Menezes, A. et al.; Handbook of Applied Cryptography; Chapter 9; CRC Press, 1996, pp. 321-368 and 397-405 (55 pages in total).

(56) References Cited

OTHER PUBLICATIONS

Preneel, Bart & van Oorschot, Paul C.; MDx-MAC and Building Fast MACs from Hash Functions; Appeared in Advances in Cryptology—Crypto 1995, Lecture Notes in Computer Science, D. Coppersmith (ed.), Springer-Verlag, 15 pages, 1995.

U.S. Appl. No. 10/025,873, filed Dec. 26, 2001.
Communication Pursuant to Article 94(3) EPC in European Application No. 12195164.4, dated Feb. 16, 2015, 5 pages.
Canadian Office Action in Canadian Application No. 2,832,348, dated Apr. 1, 2015, 3 pages.

* cited by examiner

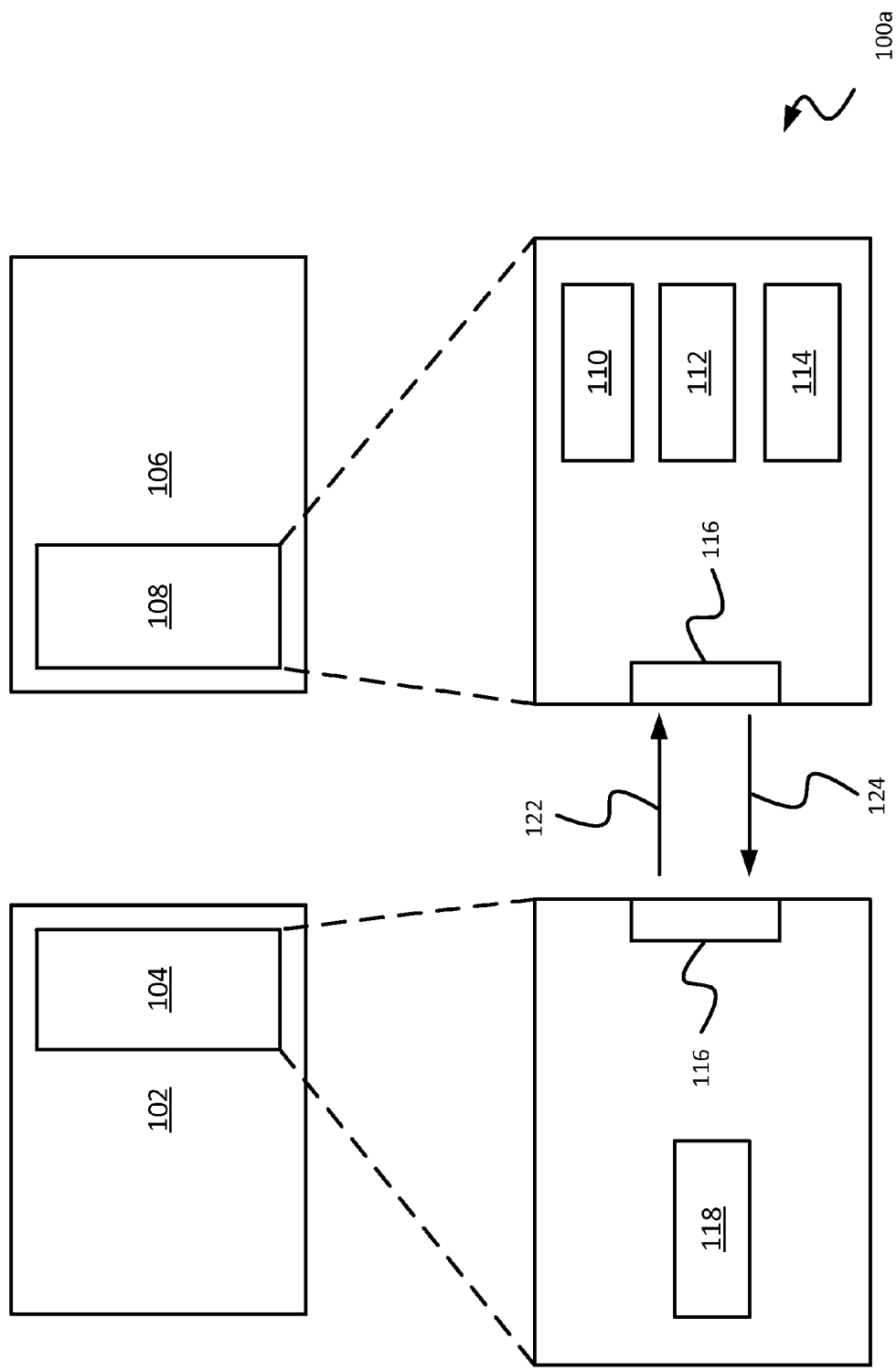

INTERROGATING AN AUTHENTICATION DEVICE

CROSS-REFERENCE TO RELATED APPLICATIONS

This application claims the benefit of U.S. Provisional Application Ser. No. 61/467,504 filed on Mar. 25, 2011, the entire contents of which are hereby incorporated by reference. This application claims the benefit of PCT Application Ser. No. PCT/CA2011/050438 filed on Jul. 15, 2011 (the entire contents of which are hereby incorporated by reference), which claims the benefit of U.S. Provisional Application Ser. No. 61/467,504 filed on Mar. 25, 2011.

BACKGROUND

This specification relates to interrogating an authentication device. Some products can authenticate product accessories to ensure that the accessories are approved by the manufacturer. For example, some smartphones can authenticate a battery upon installation of the battery, before charging, or at other times. In such cases, authentic batteries that are approved by the smartphone manufacturer include a secret function evaluator that can generate a correct response upon interrogation by the smartphone. For example, the smartphone can send a challenge to the battery, and an authentic battery can send the correct response to the smartphone.

DESCRIPTION OF DRAWINGS

FIG. 1A is a schematic diagram of an example authentication system.

Like reference numbers and designations in the various drawings indicate like elements.

DETAILED DESCRIPTION

Figure 1B:
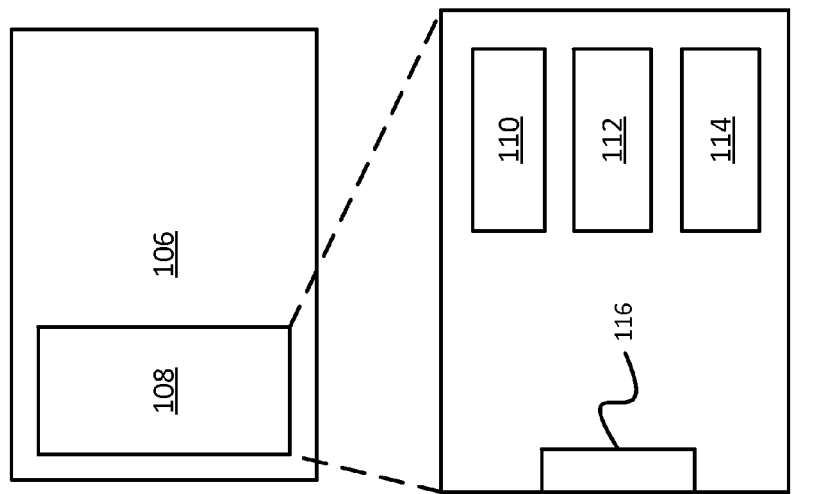
FIG. 1B is a schematic diagram of the example authentication system of FIG. 1A with a rogue observer device.
Figure 1B:
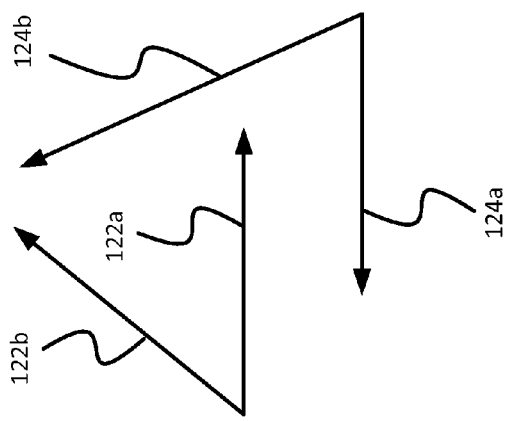
Figure 1B:
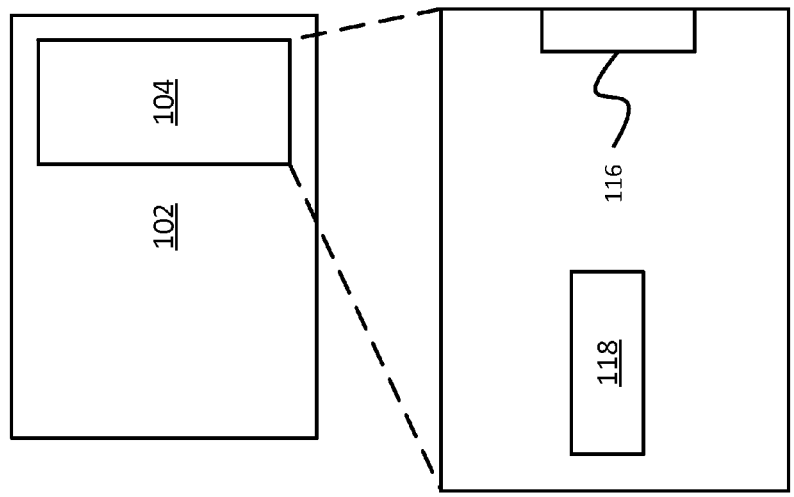

In a general aspect, an interrogator device stores challenge-response pairs and randomly selects one of the challenges for interrogating an authentication device. In some implementations, the interrogator device selects the challenge according to a biased distribution. In some implementations, the interrogation device can modify the distribution over time.

In some aspects, challenge-response pair data and challenge-response distribution data are stored in a memory of an interrogator device. The challenge-response pair data includes challenge values and corresponding response values. The challenge-response distribution data may indicate non-uniform selection probabilities for the challenge values, such that some of the challenge values have unequal selection probabilities. The interrogator device receives an authentication request from an authentication device, and the interrogator device selects an initial challenge value according to the challenge-response distribution. The interrogator device sends the authentication device an interrogation message that includes the initial challenge value.

In some aspects, the challenge-response pair data and the challenge-response distribution data are stored in a memory of a mobile device. The authentication request is received on the mobile device from a mobile device accessory, and the interrogation message is sent from the mobile device to the mobile device accessory. The mobile device accessory can be, for example, a battery for the mobile device, a companion or peripheral device for the mobile device, a replacement component for the mobile device, or another type of accessory. In some cases, the mobile device accessory can is a user input/output device, such as a headset.

Implementations of these and other aspects can include one or more of the following features. The challenge-response data can be stored on the mobile device in a compressed format based on a seed value. For example, the seed value can be stored in the memory of the mobile device along with the response values, and the challenge values for each response value can be derived using the seed value. The challenge values can be derived using the seed value based on a cryptographic hash function, a key derivation function, or some cryptographic primitive that makes determining the seed value from the derived challenge value difficult. In some implementations, this can provide roughly one half compression of the challenge-response data, or slightly less when accounting for storage of the seed value.

Additionally or alternatively, implementations of these and other aspects can include one or more of the following features. A reply message from the mobile device accessory is received on the mobile device in response to the interrogation message. The challenge-response distribution data are modified in the memory of the mobile device. Modifying the challenge-response distribution data changes the selection probability for at least one of the challenge values. Modifying the challenge-response distribution data increases the selection probability for the initial challenge value. Each challenge-response pair in the challenge-response data is generated by a cryptographic function. The cryptographic function is based on a hashing function, a key-derivation function, or another type of function where a secret key and an input value are used to generate an output value. The cryptographic function has the property that the secret key is difficult to determine even when given multiple inputs (i.e., challenge values) and their corresponding outputs (i.e., response values). The reply message received from the mobile device accessory includes a proffered response value. The proffered response value is compared to a correct response value for the initial challenge value. The mobile device accessory is approved if the proffered response value matches the correct response value.

Additionally or alternatively, implementations of these and other aspects can include one or more of the following features. A subsequent interrogation message is sent from the mobile device to the mobile device accessory. The subsequent interrogation message includes a subsequent challenge value selected at the mobile device according to the modified challenge-response distribution data. The subsequent challenge value is the same as the initial challenge value. A time delay is imposed before sending the subsequent interrogation message to the mobile device accessory. The challenge-response distribution data includes a tree structure, and each of the challenge values corresponds to a different path through the tree structure. Selecting the initial challenge value at the mobile device includes obtaining a random value and traversing the tree structure according to the random value. The challenge-response distribution data is modified in the memory of the mobile device by selecting a different tree structure.

In some aspects, interrogation devices employ multiple secret challenges and select the challenges with a random distribution. The random distribution can be a biased distribution, making it more difficult for a cloner to encounter all of the challenges. The random distribution can be changed in response to frequent authentications. The bias of the random distribution can be increased under the threat of increased authentications. The generation of challenge values can be slowed down in periods of frequent authentication or in other environments of increased cloning threat. The challenge can be selected by embedding the challenge-response pairs in a rooted tree, obtaining a random sequence, and employing the random sequence to traverse the rooted tree until a challenge-response pair is encountered. Different trees can be used to change the distribution.

In some aspects, an interrogation device employs a history of the authentication encounters to change its behavior. Failed challenge values can be repeated. Challenges can be performed randomly and intermittently during device operation. Multiple successful challenges can be required for successful authentication. Multiple challenges can be derived from common data with a cryptographic hash function or key derivation.

FIG. 1A is a schematic diagram of an example authentication system 100. The authentication system 100 includes a primary device 106 and a secondary device 102. The primary device 106 includes an interrogator module 108, and the secondary device 102 includes an authentication module 104. The authentication system 100 may include additional or different components, which may be configured as shown and described with respect to FIG. 1A, or in a different manner. The interrogator module 108 can approve or deny authentication of the authentication module 104 based on messages exchanged between the interrogator module 108 and the authentication module 104. For example, the authentication module 104 can be required to prove to the interrogator module 108 that it knows some secret information. In the example shown in FIG. 1A, the interrogator module 108 sends interrogation messages 124 to the authentication module 104, and the authentication module 104 sends reply messages 122 to the interrogator module 108. The example interrogation messages 124 include challenge values, and the example reply messages 122 include proffered response values. In some implementations, the messages include additional or different types of information. If the authentication module 104 sends the correct response value, the interrogator module 108 can approve the secondary device 102 associated with the authentication module 104.

Some conventional interrogator modules are vulnerable to replay attacks where a cloner observes the fixed (or static) challenges values used by the interrogator device. In some implementations, the interrogator module 108 shown in FIG. 1A can make it more difficult for a cloner to observe and completely characterize the challenges values. As such, the interrogator module 108 shown in FIG. 1A can make the deployment of replay cloning much less efficient, and in this way, less profitable for the counterfeiter. Counterfeit devices may pose safety hazards, exposing companies to litigation, brand damage, as well as displacing genuine products. Genuine products can be fitted with an authentication device containing a secret to be used to establish authenticity. As an example, the authentication device may be embedded into a battery. The authentication device can enable an interrogator device, for example a smartphone handset, to authenticate the battery.

In some implementations, the authentication device is required to prove to an interrogator device that it knows some secret information. One possibility is for the authentication device to compute a secret function, such as a keyed cryptographic hash. In such schemes, the interrogator device can be provided with the secret so that it can compute the challenge-response pairs. Alternatively, in some instances the risk of exposing the secret may be reduced by providing the interrogator device a collection of challenge-response pairs (i.e., without the secret key).

While limiting the interrogator device's knowledge to certain pairs can decrease the exposure risk of the authentication secret, it also opens the possibility that devices can be cloned to work for a particular interrogator device. By interposing a listening device between authenticator and device, a cloner can learn the correct responses to a limited set of challenges. In some implementations, it may be inconvenient, difficult or even impossible to update the challenge-response pairs stored in the interrogator device. For example, in some cases the interrogator device has been deployed, and it may be difficult or impossible to re-connect the interrogator device a trusted source of challenge-response pairs. In such situations, an observer may listen and learn the responses that will be required to prove authenticity to a particular interrogator device.

The interrogator module 108 shown in FIG. 1A includes a mechanism employing multiple challenge-response pairs which are used by the interrogator module 108 in such a way that a cloner, seeking to produce a device to fool a single authenticator, will typically incur additional cost to produce such cloned devices and/or incur additional time in creating such clones. This may be accomplished, in some implementations, by issuing challenges from stored challenge-response pairs with some random distribution, making it difficult for the cloner to characterize the authenticator's actions completely. The random distribution can also be changed in response to perceived cloning threat. The additional time and/or hardware that the cloner will need may serve to lessen the attractiveness of cloning in the marketplace, helping to decrease cloning.

The example interrogator module 108 shown in FIG. 1A employs multiple challenge-response pairs, and the pair to be employed at any given authentication trial is selected based on a random distribution. To decrease the storage required for these challenges, they may be derived from a common secret via a cryptographic hash function or key derivation function. In some cases, a biased (non-uniform) distribution can increase the number of authentication trials which the cloner will need to observe in order to characterize completely or effectively learn the challenges produced by the authenticator.

In some implementations, the interrogator module 108 can alter its behavior in situations where repeated authentications are being requested. For example, the interrogator module 108 may slow down the generation of challenge values in situations where authentication is being requested repeatedly within some limited timeframe. In some implementations, the interrogator module 108 may store information about the history of the authentication encounters, and alter its behavior based on this. For example, when a challenge has not been properly responded to in the past, and authenticator may repeat such challenges.

In some implementations, the distribution used to select challenge values can be biased or an existing bias can be increased, for example, when authentication requests are judged to be frequent enough to signal possible cloner activity. As a particular example, if challenge-response pairs have been assigned indexes and the random selection function is biased towards low-indexed challenges, then the bias toward low-indexed challenges may be increased in response to frequent authentication requests. In some cases, this can increase the difficulty of learning all the possible challenges, as does the slowed generation of these challenges.

In some implementations, the selection of challenges may be performed by embedding the challenges in a rooted tree. For example, a randomly-generated string may describe a path through the tree to arrive at the selected challenge-response pair. Various tree structures, for example, a tree with various branching degrees, may be used to bias the selection. Various branches may be selected in the traversal with various probabilities. Moreover, trees of bounded depth may be used to limit the amount of randomness required to make a selection, which produces a selection in bounded time, which may be important or useful in some cases.

Figure 2:
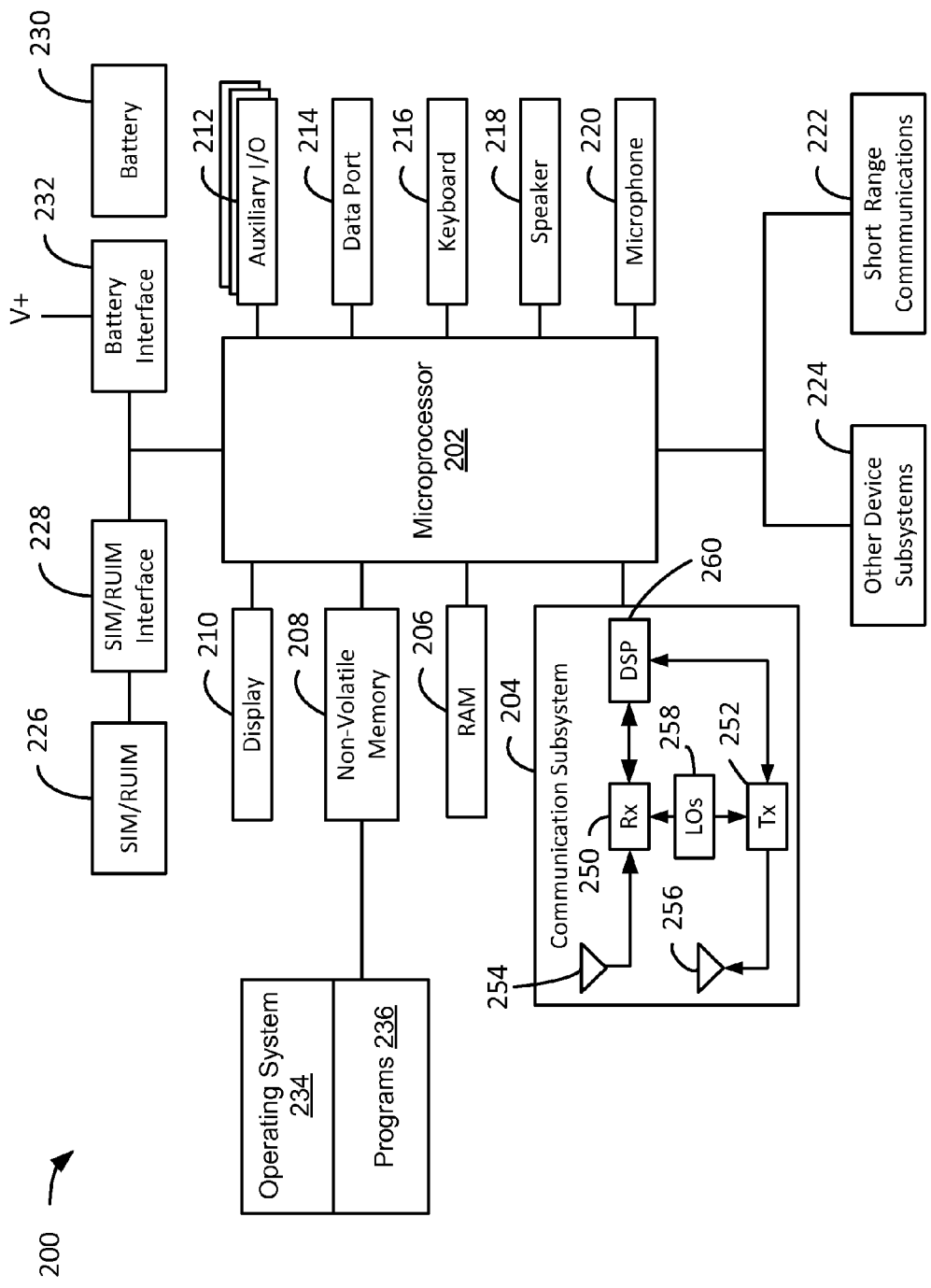
FIG. 2 is a diagram of an example mobile device.

Generally, the primary device 106 and the secondary device 102 can be any appropriate type of systems, modules, devices, components, and combinations thereof. In some examples, the primary device 106 can be a mobile device. Examples of mobile devices include various types of cellular devices, smartphones, portable media players, personal digital assistants (PDAs), laptops, notebooks, tablets, etc. FIG. 2 shows a specific example of a primary device and a secondary device. In the example shown in FIG. 2, the primary device is a mobile device 200, and the secondary device is a battery 230. In other examples where the primary device 106 is a mobile device, the secondary device 102 can be a different type of accessory to be paired with the mobile device. For example, the secondary device 102 can be a headset, a charger, a keyboard, a pointing device, a replacement part, or another type of accessory for the mobile device.

The primary device 106 and the secondary device 102 can alternatively be components of another type of system. Examples of other types of primary devices include consumer electronics, computing devices, consumer appliances, transportation systems, manufacturing systems, security systems, pharmaceutical products, medical devices, and others. In some implementations, the primary device 106 is a printer and the secondary device 102 is a cartridge for the printer. In some implementations, the primary device 106 is a badge reader and the secondary device 102 is a badge to be read by the badge reader.

The primary device 106 and the secondary device 102 can communicate through a communication link. Various types of communication links may be used, as appropriate. For example, the primary device 106 and the secondary device 102 may communicate through a wired communication link, such as a USB link, a parallel port link, a voltage terminal, or another type of wired contact. As another example, the primary device 106 and the secondary device 102 may communicate through a wireless communication link, such as a radio frequency link, an infrared link, or another type of wireless medium. The primary device 106 and the secondary device 102 may communicate through a combination of wired and wireless links. The communication link between the primary device 106 and the secondary device 102 can include the communication interface 117 of the interrogator module 108, the communication interface 116 of the authentication module 104, or any combination of these and other communication interfaces.

FIG. 1B is a schematic diagram of an example authentication system 100' with the addition of a rogue observer device 130. In the example shown in FIG. 1B, the observer device 130 observes communications between the authentication module 104 and the interrogator module 108. For example, the observer device 130 can observe multiple iterations of interrogation messages 124 and reply messages 122 in an attempt to characterize the correct response values for all of the challenge values employed by the interrogator module 108. If the observer device 130 were able to characterize the challenge-response pairs used by the interrogator module 108, malicious parties could potentially use the information to clone the authentication device. The interrogator module 108 can modify its behavior over time and/or employ other techniques to increase the amount of time required for the observer device 130 to characterize the challenge-response pairs used by the interrogator module 108.

The interrogator module 108 can be implemented by hardware, software, firmware, or a combination thereof. For example, in some cases, all or part of the interrogator module 108 can be implemented as a software program executed by a microprocessor. As another example, in some cases, all or part of the interrogator module 108 can be implemented as digital or analog circuitry. In some instances, the interrogator module 108 is integrated with and/or utilizes other software or hardware resources of the primary device 106, or the interrogator module 108 can be a standalone module. The interrogator module 108 includes a communication interface 117 that transmits the interrogation messages 124 and receives the reply messages 122. The communication interface 117 can include a wired interface, a wireless interface, or a combination of these.

The interrogator module 108 includes challenge-response data 110. The challenge-response data 110 can include multiple challenge-response pairs. Each challenge-response pair can include a challenge and a corresponding response. The challenge values and response values can be values that were previously generated, for example, by a cryptographic function. In some instances, the challenge-response data are generated external to the interrogator module 108 and then transferred to the interrogator module 108. A hashing function or a key-derivation function may be used to derive the challenge-response pairs. In some instances, a SHA-based hashing function (e.g., SHA-1, etc.) is used to generate the challenge-response pairs. In some instances, a public key cryptography algorithm (e.g., RSA, ECC) is used to generate the challenge-response pairs. Additional or different types of functions may be used to generate the challenge-response pairs. In some instances, only a subset of challenge-response pairs that can be generated by a particular cryptographic function are stored on the interrogator module 108.

The challenge-response data 110 can include an explicit representation of the challenge values and response values. In some implementations, challenge-response data 110 includes a compressed or otherwise encoded representation of some or all of the challenge values and response values, which may reduce the amount of storage spaced required in some cases. For example, the challenge-response data 110 can include a common seed value, or multiple common seed values, and the challenge values can be derived by employing a suitable cryptographic function such as a hash function or a key derivation function that operates on the common seed values. In such implementations, the cryptographic function can be selected such that the common seed values are difficult to derive from the output of the function.

The interrogator module 108 includes challenge-response distribution data 112. The challenge-response distribution data 112 indicate selection probabilities for the challenge-response pairs. For example, one or more challenge-response distributions can be randomly sampled to select a challenge-response pair each time a challenge is sent to the authentication module 104. The distributions can be biased (or non-uniform), such that the selection probabilities are higher (or lower) for some of the challenge-response pairs than for others. The distributions can be modified over time, for example, based on the passage of time, based on the authentication history of the interrogator module 108, and/or based on other criteria.

In some implementations, challenge-response pairs are encoded in a tree structure that defines the distribution. The tree structure may include nodes that are connected in a hierarchy, where connections among the nodes define multiple paths through the tree structure. Clustering or grouping of the nodes in the tree structure may be used to assign a probability of terminating at a particular leaf node upon a random traversal of the tree structure from the root node. For example, a challenge-response pair may be selected by obtaining a random number, traversing a path through the tree structure according to the random number, and selecting a challenge-response pair associated with the node at the end of the path. In some implementations, the challenge-response distribution can be defined by a probability distribution function included in the challenge-response distribution data 112.

The interrogator module 108 includes a challenge selection module 114 that can access the challenge-response data 110 and the challenge-response distribution data 112, and select a particular challenge-response pair according to the distribution data. For example, the challenge selection module 114 can select one of the challenge values by randomly sampling the distribution. The selected challenge value can be transmitted to the authentication module 104 in the interrogation message 124. The interrogator module 108 includes a communication interface 116 that transmits the interrogation messages 124 and receives the reply messages 122.

The authentication module 104 can be implemented by hardware, software, firmware, or a combination thereof. For example, in some cases, all or part of the authentication module 104 can be implemented as a software program executed by a microprocessor. As another example, in some cases, all or part of the authentication module 104 can be implemented as digital or analog circuitry. In some instances, the authentication module 104 is integrated with and/or utilizes other software or hardware resources of the secondary device 102, or the authentication module 104 can be a standalone module. The authentication module 104 includes a communication interface 116 that transmits the reply messages 122 and receives the interrogation messages 124. The communication interface 116 can include a wired interface, a wireless interface, or a combination of these.

The authentication module 104 includes a response-generator module 118 that can generate a response value based on a challenge value received from the interrogator module 108. For example, the response-generator module 118 can receive a challenge value from the interrogator module 108 and generate a proffered response value. The proffered response value can be generated by evaluating a cryptographic function at the response-generator module 118. For example, the response-generator module 118 can have access to a private key value and a cryptographic function that generates the correct response values for all challenge-response pairs stored on the interrogator module 108. In some instances, the response-generator module 118 can evaluate the cryptographic function that was used to generate the challenge-response data 110 stored on the interrogator module 108. In some implementations, the cryptographic function is a global function that can be used to generate the correct response value for the particular challenges stored on the interrogator module 108, as well as other challenges. The proffered response value generated by the response-generator module 118 can be transmitted to the interrogator module 108 in the reply message 122.

FIG. 2 is a schematic diagram of an example mobile device 200. For example, the mobile device 200 can be a BLACKBERRY® mobile device and/or another type of mobile device. In some implementations, the mobile device 200 is a dual-mode mobile device. The example mobile device 200 in FIG. 2 includes a microprocessor 202, a communication subsystem 204, random access memory (RAM) 206, non-volatile memory 208, a display 210, one or more auxiliary input/output (I/O) devices 212, a data port 214, a keyboard 216, a speaker 218, a microphone 220, a short-range wireless communications subsystem 222, other device subsystems 224, a SIM/RUIM card (i.e., a Subscriber Identity Module or a Removable User Identity Module) 226, a SIM/RUIM interface 228, a rechargeable battery 230, a battery interface 232, and possibly other components. The mobile device 200 may include the same, additional, and/or different features, which may be arranged and/or operate in the manner shown or in a different manner.

The example mobile device 200 is a battery-powered device that includes a battery interface 232 that receives direct current electrical power from one or more rechargeable batteries 230. The battery 230 can be a smart battery with an embedded microprocessor or a different type of battery. The battery interface 232 may be coupled to a regulator (not shown), which may assist the battery 230 in providing power V+ to the mobile device 200. Additionally or alternatively, the mobile device 200 may receive power from an external source (e.g., an alternating current power source, an adapter, a converter, etc.) and/or a different type of internal power source.

The example mobile device 200 shown in FIG. 2 is a two-way communication device having voice and data communication capabilities. The mobile device 200 may communicate over wireless networks, including wireless telecommunication networks, wireless data networks, combined voice and data networks, and/or other types of wireless networks. Thus, the mobile device 200 may communicate over a voice network, such as any of the analog or digital cellular networks, and may also communicate over a data network. Voice and data networks may be implemented as separate communication networks using separate infrastructure, such as base stations, network controllers, etc., or the voice and data networks may be integrated into a single wireless network. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or others.

In the example mobile device 200 shown in FIG. 2, the communication subsystem 204 includes a receiver 250, a transmitter 252, antennae 254 and 256, one or more local oscillators 258, a digital signal processor (DSP) 260 and possibly other features. The antennae 254 and 256 may include antenna elements of a multiple-element antenna, embedded antennae, radio frequency (RF) antennae, and/or other types of antennae. The communication subsystem 204 is used to communicate with the network. The DSP 260 is used to receive and send signals through the receiver 250 and the transmitter 252, respectively, and the DSP 260 provides control information to the receiver 250 and the transmitter 252. For example, the gain levels applied to communication signals in the receiver 250 and the transmitter 252 may be adaptively controlled through automatic gain control algorithms implemented in the DSP 260. Additional and/or different types of control algorithms may be implemented in the DSP 260 to provide more sophisticated control of the communication subsystem 204.

In some implementations, the local oscillator 258 is a single local oscillator that provides a reference signal for the receiver 250 and the transmitter 252, for example, where voice and data communications occur at a single frequency, or closely-spaced sets of frequencies. Alternatively, for example if different frequencies are utilized for voice communications and data communications, the local oscillator 258 may include multiple local oscillators that are used to generate multiple different frequencies corresponding to the voice and data networks. Information, which may include both digital voice and digital data information, can be communicated within the mobile device 200 to and from the communication subsystem 204 through a link or bus between the DSP 260 and the microprocessor 202. The design and configuration of the communication subsystem 204, such as frequency band, component selection, power level, etc., may depend on the communication network in which the mobile device 200 is intended to operate. For example the communication subsystem 204 may be configured for 2G, 2.5G, 3G, 4G, and other voice and data networks, such as GSM, CDMA2000, GPRS, EDGE, W-CDMA (UMTS), FOMA, EV-DO, TD-SCDMA, HSPA, HSOPA, and the like.

After any required network registration or activation procedures have been completed, the mobile device 200 may send and receive communication signals, including both voice and data signals, over the wireless networks. Signals received by the antenna 254 from the communication network are routed to the receiver 250, which provides signal amplification, frequency down conversion, filtering, channel selection, etc., and may also provide analog to digital signal conversion. Analog to digital conversion of the received signal allows the resulting digital signal to be decoded by the DSP 260. Signals to be transmitted to the network are processed (e.g., modulated, encoded, etc.) by the DSP 260 and are then provided to the transmitter 252 for digital to analog conversion, frequency up conversion, filtering, amplification and transmission to the communication network via the antenna 256.

In some implementations, the mobile device 200 can send and receive communication signals over the wireless network after wireless network registration or activation procedures have been completed. The wireless network registration or activation procedures for the mobile device 200 may vary based on the type of network or networks with which the mobile device 200 operates. Wireless network access for the example mobile device 200 shown in FIG. 2 is associated with a subscriber or user of the mobile device 200. In particular, the SIM/RUIM card 226 in the SIM/RUIM interface 228 identifies the subscriber or user of the mobile device 200. With the SIM/RUIM card 226 in the SIM/RUIM interface 228, a subscriber can access all subscribed services through the wireless network. For example, subscribed services may include web browsing, e-mail, voice mail, Short Message Service (SMS), Multimedia Messaging Services (MMS), and/or others. The SIM/RUIM card 226 in the SIM/RUIM interface 228 communicates with the microprocessor 202 on the mobile device 200. To identify the subscriber, the SIM/RUIM card 226 may include user parameters, such as an International Mobile Subscriber Identity (IMSI) and/or another type of subscriber identifier. The SIM/RUIM card 226 may store additional and/or different subscriber information, including calendar information, call log information, contacts information, and/or other types of information. Additionally or alternatively, user identification information can also be stored in the non-volatile memory 208.

The data port 214 may include a serial port, a parallel port, and/or another type of connection port. In some implementations, the data port 214 is a Universal Serial Bus (USB) port that includes data lines for data transfer and a supply line that can provide a charging current to charge the battery 230 of the mobile device 200. The mobile device 200 may be manually synchronized with a host system, for example, by connecting the mobile device 200 through the data port 214 (e.g., in an interface cradle and/or another type of wired connection) that couples the mobile device 200 to a data port of a computer system or other device. The data port 214 may also be used to enable a user to set preferences through an external device or software application, or to download other programs for installation. The wired connection of the data port 214 may be used to load an encryption key onto the device, which may be more secure method than exchanging encryption information via the wireless network.

The short-range communications subsystem 222 provides for communication between the mobile device 200 and different systems or devices, without the use of the wireless network. For example, the short-range communications subsystem 222 may include an infrared or radio frequency device and associated circuits and components for short-range communication. Examples of short-range communication standards include standards developed by the Infrared Data Association (IrDA), BLUETOOTH®, the 802.11 family of standards developed by IEEE, and others.

The microprocessor 202 manages and controls the overall operation of the mobile device 200. Many types of microprocessors or microcontrollers may be used. Additionally or alternatively, a single DSP 260 may be used to carry out one or more functions of the microprocessor 202. Low-level communication functions, including data and voice communications, may be performed through the DSP 260 in the communication subsystem 204. High-level communication applications, such as voice communication applications, data communication applications, and/or other types of software applications may be stored in the non-volatile memory 208 for execution by the microprocessor 202. The microprocessor 202 also interacts with other device subsystems, such as the display 210, the RAM 206, the auxiliary input/output (I/O) devices 212, the data port 214, the keyboard 216, the speaker 218, the microphone 220, the SIM/RUIM interface 228, the battery interface 232, the short-range communications subsystem 222, and any other device subsystems generally designated as 224.

The non-volatile memory 208 includes erasable persistent storage, for example, flash memory, battery-backed-up RAM, and/or other types of memory. In the example shown in FIG. 2, the non-volatile memory 208 stores instructions and data associated with an operating system 234, programs 236 that provide various types of functionality for the mobile device 200, and other types of information. The non-volatile memory 208 may include a file system to facilitate storage of data items on the device. For example, the operating system 234, the programs 236, and/or other modules executed on the microprocessor 202 may store, retrieve, modify, delete, and/or otherwise manipulate data by accessing (e.g., read, write, etc.) the file system provided on the non-volatile memory 208.

Data stored in the non-volatile memory 208 and/or other computer-readable media on the mobile device 200 may include user application data, text files, image files, voicemail data, and other data generated by the user at the mobile device 200 or received and stored by the mobile device 200. The user application data may include, for example, e-mail message data, address book data, contact information data, calendar appointment data, instant message data, SMS message data, voicemail data, user-entered data, and/or other types of application data. Voicemail data may include digitized audio recordings and/or stub entries available for viewing in a messaging application indicating the availability of a voicemail message stored at another location. User-entered data may include text-based, graphic, or other multimedia files loaded onto the mobile device 200 by the user.

The operating system 234 controls low-level functions of the mobile device 200 and facilitates operation of the programs 236. For example, the operating system 234 may provide an interface between one or more of the programs 236 and one or more hardware components on the mobile device 200. The programs 236 include computer program modules that can be executed by the microprocessor 202 (and/or the DSP 260 in some instances). In some implementations, one or more of the programs 236 are executed by the microprocessor 202 and provide a high-level interface between a user and the mobile device 200. The user interface provided by a program 236 typically includes a graphical component provided through the display 210, and may additionally include an input/output component provided through the auxiliary I/O devices 212, the keyboard 216, the speaker 218, and/or the microphone 220. The operating system 234, specific device applications or programs 236, or parts thereof, may be temporarily loaded into a volatile store, such as RAM 206, for faster operation. Moreover, received communication signals may also be temporarily stored to RAM 206 before they are permanently written to a file system in the non-volatile memory 208.

The programs 236 stored in the non-volatile memory 208 may include, for example, a message application, a calendar application, one or more third party applications, and other types of applications. The programs 236 may include additional or different modules, programs, or applications, such as, for example, a Personal Information Manager (PIM) module, a connect module, a device state module, an IT policy module, a multi service platform manager, and/or others. The programs 236 may include programs that control basic device operations, which would typically be installed on the mobile device 200 during its manufacture and/or initial configuration. Other types of software applications, such as, for example, third party applications and/or other types of modules, may be added after the manufacture and initial configuration of the mobile device 200. Examples of third party applications include games, utilities, internet applications, etc. Generally, any of the programs 236 may be updated and/or modified at any time. The additional applications and/or updates to applications can be loaded onto the mobile device 200 through the wireless network, the auxiliary I/O devices 212, the data port 214, the short-range communications subsystem 222, or any other suitable device subsystem 224. The non-volatile memory 208 may also store keys, which may include encryption and decryption keys and addressing information for use in communicating between the mobile device 200 and servers.

The non-volatile memory 208 can include an interrogator module. For example, the interrogator module can be implemented as a software module that is executed by the microprocessor 202. The interrogator module can include the features and attributes of the interrogator module 108 of FIG. 1A, or a different type of interrogator module. The interrogator module of the mobile device 200 can communicate with accessories of the mobile device 200, for example, to authenticate the accessories. In some instances, the interrogator module authenticates the battery 230, the SIM card and/or other internal or external components or devices associated with the mobile device 200. As such, the battery 230, the SIM card and/or other internal or external components or devices may include an authentication module, such as the authentication module 104 of FIG. 1A or a different type of authentication module.

In some examples, the battery 230 includes an authentication module that communicates with the interrogator module by voltage-modulated signals transmitted through a terminal of the battery interface 232. For example, the battery 230 may send the microprocessor 202 an authentication request, receive a challenge message from the microprocessor 202, and send the microprocessor 202 a reply message by voltage-modulated signals transmitted through the battery interface 232. The microprocessor 202 can convert the voltage-modulated signals from the battery 230 to messages that can be processed by the interrogator module. Similarly, the microprocessor 202 can convert the messages from the interrogator module to voltage-modulated signals that are transmitted to the battery 230.

Figure 3:
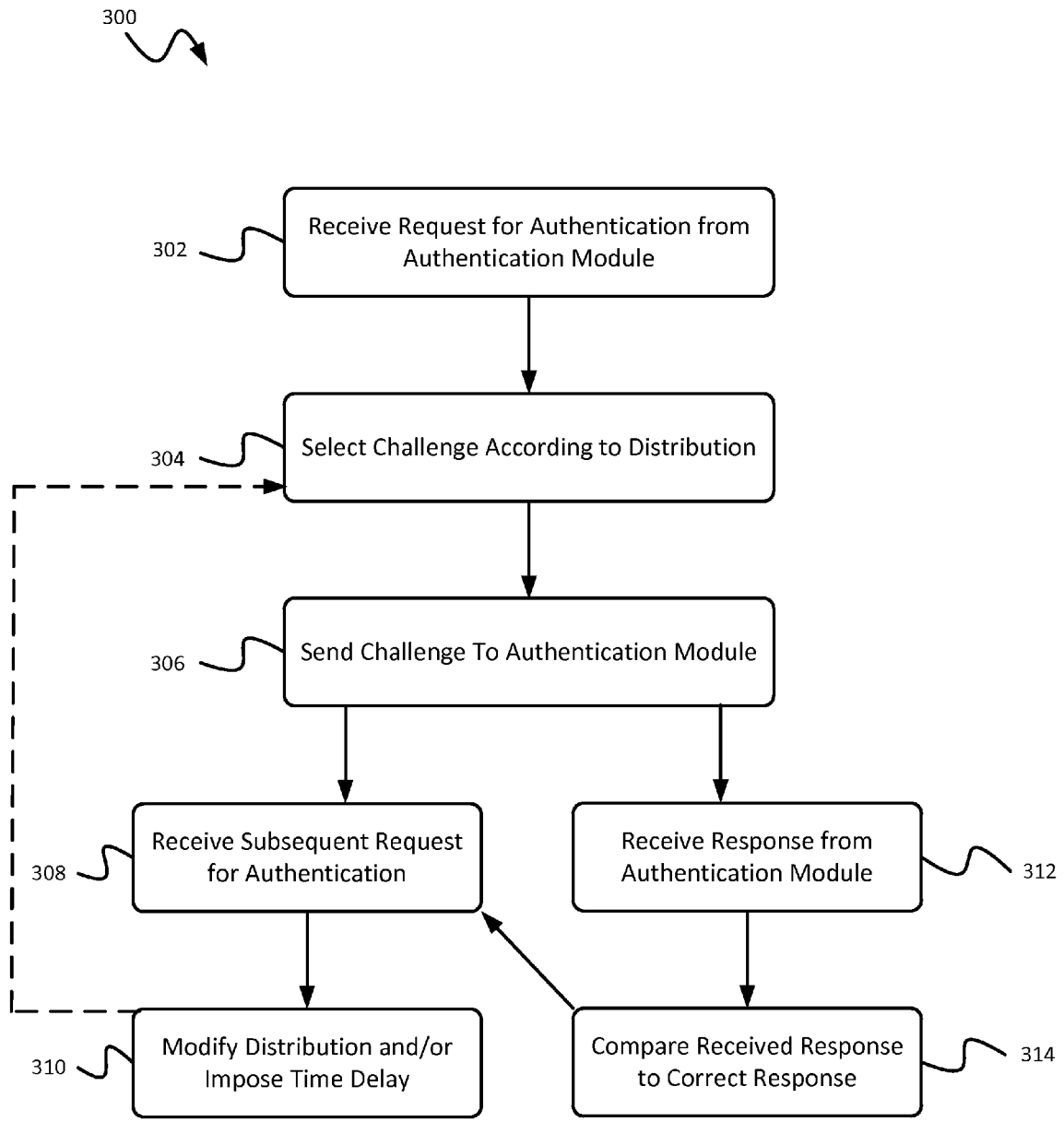
FIG. 3 is a flow chart showing an example process for interrogating an authentication device.

FIG. 3 is a flow chart showing an example process 300 for interrogating an authentication device. The process 300 can be implemented in an authentication system. For example, the process 300 can be implemented by the interrogator module 108 shown in FIG. 1A, or by a different type of system. The example process 300 shown in FIG. 3 can be implemented using additional, fewer, or different operations, which can be performed in the order shown or in a different order. In some implementations, one or more of the operations can be repeated or iterated, for example, until a terminating condition is reached.

At 302, the interrogator module receives an authentication request from an authentication module. The interrogator module has access to multiple different challenge-response pairs, and the challenges can be used to authenticate the authentication module. At 304, the interrogator module randomly selects one of the challenges according to a distribution. The distribution can be a biased distribution, where the selection probabilities for some of the challenges are higher than the selection probabilities for other challenges. At 306, the interrogator module sends the challenge to the authentication module. The interrogator module may, in some cases, receive a response from the authentication module (at 312), and the interrogator module may then compare the received response to the correct response (at 314) to determine whether the authentication module generated the correct response. The interrogator module can approve the authentication module if the correct response is received, or the interrogator module can deny approval for the authentication module if an incorrect response is received.

At 308, the interrogator module receives a subsequent request for authentication. At 310, the distribution is modified and/or a time delay for generating subsequent challenges may be imposed. In some implementations, the distribution can be modified and/or the time delay can be imposed in response to additional or different types of events or criteria. The distribution can be modified in a manner that reduces the rate at which challenge values and response values can be observed, for example, by cloners. In some cases, the selection probability for the initial challenge value selected at 304 can be increased, such that the likelihood of selecting different challenge values decreases, at least until the distribution is modified again. The time delay can be imposed in response to receiving multiple authentication requests over a given period of time. For example, if more than one or two requests are received within an hour or some other threshold timeframe, the interrogator module can impose a time delay (e.g., a second, a few seconds, a minute, a few minutes, an hour, a day, a week) before issuing subsequent challenges. As such, the time delay can also reduce the rate at which challenge values and response values can be observed.

Figure 4:
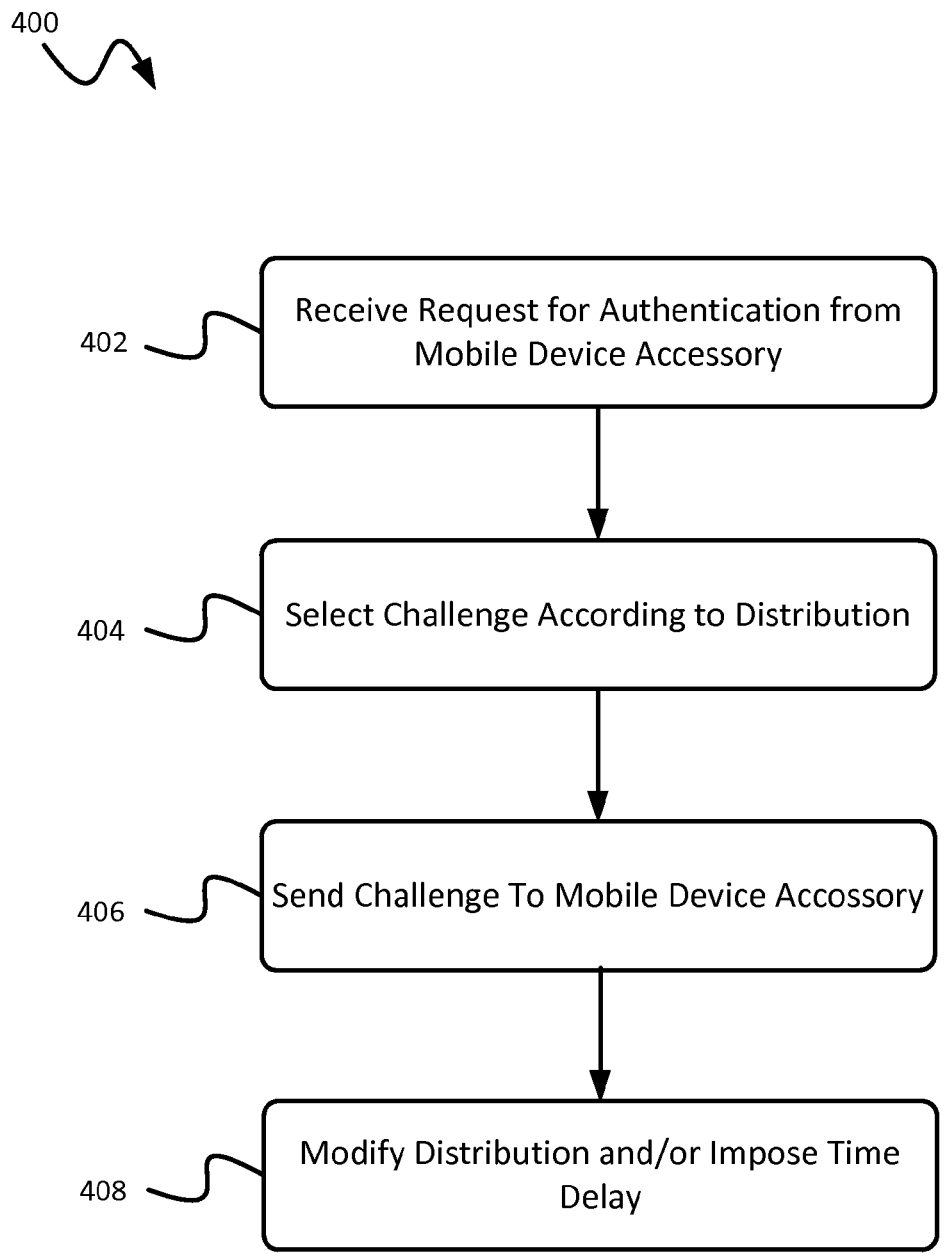
FIG. 4 is a flow chart showing an example process for authenticating a mobile device accessory.

FIG. 4 is a flow chart showing an example process for authenticating a mobile device accessory. The process 400 can be implemented by a mobile device, for example, to authenticate a battery, a headset, or another type of mobile device accessory. For example, the process 400 can be implemented by the mobile device 200 shown in FIG. 2, or by a different type of mobile device. The example process 400 shown in FIG. 4 can be implemented using additional, fewer, or different operations, which can be performed in the order shown or in a different order. In some instances, the example process 400 incorporates one or more of the operations from the process 300 of FIG. 3. In some implementations, one or more of the operations can be repeated or iterated, for example, until a terminating condition is reached.

At 402, the mobile device receives a request for authentication from a mobile device accessory. The request may be received upon installation of the accessory, upon rebooting the mobile device, during normal operation of the mobile device, or at a combination of these and other instances. The mobile device stores challenge-response pairs that can be used to authenticate mobile device accessories. At 404, the mobile device selects one of the challenge-response pairs. The challenge-response pair can be selected randomly, for example, according to a distribution. The distribution can be a biased (or non-uniform) distribution that makes selection of certain challenge-response pairs more likely than others. For example, the challenge-response pairs can be encoded in a tree structure, where each of the challenge-response pairs corresponds to a different path through the tree structure. As such, the location of each challenge-response pair in the tree can determine the selection probability for the challenge-response pair.

At 406, the challenge of the selected challenge-response pair is sent to the mobile device accessory. At 408, the distribution is modified and/or a time delay is imposed. For example, the distribution can be modified by modifying the tree structure or by selecting a different tree structure. Modifying the distribution changes the selection probability for at least one of the challenge-response pairs stored on the mobile device. For example, modifying the distribution may increase the probability of sending the same challenge upon subsequent interrogation events. As such, modifying the distribution may help to ensure that at least some of the challenge-response pairs are not exposed within a given timeframe. The time delay can be imposed, in some cases, to ensure that challenges are not sent too frequently. For example, the time delay can also help to limit rate at which challenge-response pairs can be exposed to an observer.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for authenticating an accessory of a mobile device, the method comprising:
    receiving at a mobile device an authentication request from a mobile device accessory;
    selecting an initial challenge value at the mobile device in response to receiving the authentication request, the initial challenge value selected from a plurality of challenge values based on challenge-response distribution data stored on the mobile device, the challenge-response distribution data indicating selection probabilities for the plurality of challenge values;
    sending an interrogation message from the mobile device to the mobile device accessory, the interrogation message comprising the initial challenge value;
    modifying the challenge-response distribution data stored on the mobile device, wherein modifying the challenge-response distribution data increases the selection probability for the initial challenge value;
    selecting a subsequent challenge value from the plurality of challenge values based on the modified challenge-response distribution data; and
    sending a subsequent interrogation message from the mobile device to the mobile device accessory, the subsequent interrogation message comprising the subsequent challenge value.

2. The method of claim 1, further comprising receiving, at the mobile device, a reply message from the mobile device accessory in response to the interrogation message.

3. The method of claim 2, wherein the mobile device stores challenge-response pair data that include the plurality of challenge values and a plurality of response values, each of the response values corresponds to one of the challenge values, the reply message from the mobile device accessory includes a proffered response value, and the method further comprises comparing the proffered response value to a particular response value that corresponds to the initial challenge value.

4. The method of claim 3, wherein each of the response values is related to one of the challenge values by a cryptographic function, and the cryptographic function includes at least one of a hashing function or a key-derivation function.

5. The method of claim 1, wherein the subsequent challenge value is the same as the initial challenge value.

6. The method of claim 1, further comprising imposing a time delay before sending the subsequent interrogation message.

7. The method of claim 1, wherein the challenge-response distribution data comprises a tree structure, wherein each of the plurality of challenge values corresponds to a different path through the tree structure, and wherein selecting the initial challenge value at the mobile device comprises:
    obtaining a random value; and
    traversing the tree structure according to the random value.

8. The method of claim 7, further comprising updating the challenge-response distribution data on the mobile device by selecting a different tree structure.

9. The method of claim 1, wherein the mobile device accessory is a battery for the mobile device.

10. The method of claim 1, further comprising deriving one or more of the plurality of challenge values at the mobile device by evaluating a cryptographic function based on one or more seed values stored on the mobile device.

11. A mobile device comprising:
    memory storing:
        challenge-response pair data including a plurality of challenge values;
        challenge-response distribution data indicating selection probabilities for each of the plurality of challenge values;
    an interface configured to receive an authentication request from a mobile device accessory; and data processing apparatus operable to execute instructions stored on the mobile device to perform operations comprising:

selecting an initial challenge value in response to receiving an authentication request from an accessory of the mobile device, the initial challenge value selected from a plurality of challenge values based on the challenge-response distribution data sending an interrogation message from the mobile device to the mobile device accessory, the interrogation message comprising the initial challenge value;

modifying the challenge-response distribution data stored on the mobile device, wherein modifying the challenge-response distribution data increases the selection probability for the initial challenge value;

selecting a subsequent challenge value from the plurality of challenge values based on the modified challenge-response distribution data; and sending a subsequent interrogation message from the mobile device to the mobile device accessory, the subsequent interrogation message comprising the subsequent challenge value.

12. The mobile device of claim 11, further comprising the mobile device accessory, wherein the mobile device accessory includes an accessory interface communicably coupled to the interface of the mobile device.

13. The mobile device of claim 12, wherein the mobile device accessory comprises a mobile device battery, and the accessory interface comprises a battery terminal.

14. The mobile device of claim 12, wherein the mobile device accessory comprises at least one of a user input accessory or a user output accessory.

15. The mobile device of claim 14, wherein the interface of the mobile device comprises at least one of a port connection or a wireless interface.

16. A non-transitory computer-readable medium storing instructions that are operable when executed by data processing apparatus to perform operations for authenticating an accessory of a mobile device, the operations comprising:

receiving at a mobile device an authentication request from a mobile device accessory;

selecting an initial challenge value at the mobile device in response to receiving the authentication request, the initial challenge value selected from a plurality of challenge values based on challenge-response distribution data stored on the mobile device, the challenge-response distribution data indicating selection probabilities for the plurality of challenge values;

sending an interrogation message from the mobile device to the mobile device accessory, the interrogation message comprising the initial challenge value;

modifying the challenge-response distribution data stored on the mobile device, wherein modifying the challenge-response distribution data increases the selection probability for the initial challenge value;

selecting a subsequent challenge value from the plurality of challenge values based on the modified challenge-response distribution data; and sending a subsequent interrogation message from the mobile device to the mobile device accessory, the subsequent interrogation message comprising the subsequent challenge value.

17. The computer-readable medium of claim 16, the operations further comprising:

receiving a reply message from the mobile device accessory in response to the interrogation message, the reply message including a proffered response value; and comparing the proffered response value to a particular response value that corresponds to the initial challenge value.

18. The computer-readable medium of claim 17, the operations further comprising approving the mobile device accessory in response to determining that the proffered response value matches the particular response value.

19. The computer-readable medium of claim 17, the operations further comprising rejecting the mobile device accessory in response to determining that the proffered response value does not match the particular response value.

20. The computer-readable medium of claim 16, wherein the challenge-response distribution data comprises a tree structure, wherein each of the plurality of challenge values corresponds to a different path through the tree structure, and wherein selecting the initial challenge value at the mobile device comprises:

obtaining a random value; and traversing the tree structure according to the random value.

21. The computer-readable medium of claim 16, wherein the mobile device accessory comprises a battery for the mobile device.

22. A method comprising:

receiving at an interrogator device an authentication request from an authentication device;

selecting an initial challenge value at the interrogator device in response to receiving the authentication request, the initial challenge value selected from a plurality of challenge values based on challenge-response distribution data stored on the interrogator device, the challenge-response distribution data indicating selection probabilities for the plurality of challenge values sending an interrogation message from the interrogator device to the authentication device, the interrogation message comprising the initial challenge value;

modifying the challenge-response distribution data stored on the interrogator device, wherein modifying the challenge-response distribution data increases the selection probability for the initial challenge value;

selecting a subsequent challenge value from the plurality of challenge values based on the modified challenge-response distribution data; and sending a subsequent interrogation message from the interrogator device to the authentication device, the subsequent interrogation message comprising the subsequent challenge value.

23. The method of claim 22, further comprising modifying the challenge-response distribution data on the interrogator device, wherein modifying the challenge-response distribution data changes the selection probability for at least one of the plurality of challenge values.

24. The method of claim 22, wherein the interrogator device and the authentication device communicate over a wired connection.

25. The method of claim 22, wherein the interrogator device and the authentication device communicate over a wireless connection.

26. The method of claim 22, further comprising deriving one or more of the plurality of challenge values at the interrogator device by evaluating a cryptographic function based on one or more seed values stored on the interrogator device.

* * * * *